United States Patent
Hsu et al.

(12) United States Patent (10) Patent No.: US 12,518,024 B1
(45) Date of Patent: Jan. 6, 2026

(54) DETECTION OF WEAKNESSES IN BINARY CODES

(71) Applicant: VicOne Corporation, Tokyo (JP)

(72) Inventors: Shih-Han Hsu, Taipei (TW);
Jui-Chang Hsu, Taipei (TW);
Chih-Sung Chen, Taipei (TW); Yu-Yu Liao, Taipei (TW); Hao-Min Lin, Taipei (TW)

(73) Assignee: VicOne Corporation, Tokyo (JP)

( * ) Notice: Subject to any disclaimer, the term of this patent is extended or adjusted under 35 U.S.C. 154(b) by 111 days.

(21) Appl. No.: 18/673,957

(22) Filed: May 24, 2024

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......... G06F 21/10; G06F 21/12; G06F 21/57; G06F 21/577
See application file for complete search history.

(56) References Cited

U.S. PATENT DOCUMENTS

| | | | |
|---|---|---|---|
| 2022/0012346 A1* | 1/2022 | Jagad | G06F 21/577 |
| 2022/0188408 A1* | 6/2022 | Gupta | G06F 21/563 |
| 2022/0237300 A1* | 7/2022 | Regev | G06F 16/245 |
| 2022/0244953 A1* | 8/2022 | Ji | G06F 8/41 |
| 2023/0281318 A1* | 9/2023 | Clement | G06F 8/33 726/25 |
| 2023/0342466 A1* | 10/2023 | Briliauskas | G06N 3/08 |
| 2024/0028740 A1* | 1/2024 | Chan | G06F 21/577 |
| 2024/0152624 A1* | 5/2024 | Helyar | G06F 21/563 |
| 2024/0211225 A1* | 6/2024 | Sevcenko | G06F 8/53 |
| 2024/0419804 A1* | 12/2024 | Das | G06F 21/577 |

OTHER PUBLICATIONS

"The Bug Hunter's Workbench", Joern, https://joern.io/, 2024, Downloaded May 9, 2024.
"fkie-cad/cwe_checker: cwe_checker finds vulnerable patterns in binary executables", GitHub, Inc., https://github.com/fkie-cad/cwe_checker, Downloaded May 9, 2024.
"NationalSecurityAgency/ghidra: Ghidra is a software reverse engineering (SRE) framework", GitHub, Inc., https://github.com/NationalSecurityAgency/ghidra, Downloaded May 10, 2024.

* cited by examiner

*Primary Examiner* — Boris D Grijalva Lobos
(74) *Attorney, Agent, or Firm* — Beyer Law Group LLP (57) ABSTRACT

Weaknesses are detected in binary codes. Vulnerable code snippets are completed into corresponding compilable codes that are in source code form using a generative artificial intelligence (AI) model. The compilable codes are compiled into corresponding binary codes. The binary codes are decompiled into decompiled codes that are in source code form. The decompiled codes are used as training data to train another generative AI model to detect one or more weaknesses that may be present in target decompiled codes. A target binary code is detected to have a weakness when the other generative AI model identifies the weakness in a corresponding target decompiled code of the target binary code.

16 Claims, 8 Drawing Sheets

DETECTION OF WEAKNESSES IN BINARY CODES

TECHNICAL FIELD

The present disclosure is directed to cybersecurity.

BACKGROUND

A weakness is a flaw, error, or other vulnerability that can be exploited in a cyberattack. Known weaknesses in program code may be identified from the Common Weaknesses Enumeration (CWE) list, which is maintained by the MITRE corporation. Information in the CWE list is oriented towards high-level concepts and directions, making it relatively difficult to create a detector that accurately defines a weakness in terms of its corresponding CWE entry.

A CWE scanner scans program code for CWE weaknesses, i.e., weaknesses that are in the CWE list. Open-source tools that may be used to scan for CWE weaknesses include Joern and cwe_checker. Generally, there are more available CWE source code scanners than CWE binary code scanners because it is easier to define and understand the intention of source codes compared to binary codes. More particularly, CWE binary code scanning requires a clear definition of binary patterns and knowledge of specific control flows. Consequently, a traditional CWE binary code scanner that is configured to detect a weakness in particular binary code may fail to detect the same weakness if the logic of the binary code is changed. Another problem with traditional CWE binary code scanners is that they require up-to-date patterns to remain effective in detecting specific CWE weaknesses. But since the patterns may take a while to develop and deploy, the CWE binary code scanner is unable to detect some weaknesses in the interim.

A generative artificial intelligence (AI) model is a neural network that is based on a generative architecture that compresses content through a set of encoders and restores the content using decoders. Through this process of compression and restoration, the generative AI model learns specific knowledge. Generative AI models are currently very popular and are used in a variety of fields. However, generative AI models have a tendency to "hallucinate," i.e., generate incorrect, fabricated, or nonsensical information that appears to be factual or relevant but is not grounded in reality or the data it was trained on, making conventional use of generative AI models unreliable in detecting weaknesses.

BRIEF SUMMARY

In one embodiment, a method of detecting weaknesses in binary codes includes receiving vulnerable code snippets, each of the vulnerable code snippets being in source code form and having one or more weaknesses. The vulnerable code snippets are completed into corresponding compilable codes that are in source code form using a first generative artificial intelligence (AI) model. The compilable codes are compiled into corresponding binary codes. The binary codes are decompiled into corresponding decompiled codes that are in source code form. A second generative AI model is trained using the decompiled codes as training data to identify weaknesses in target decompiled codes that are in source code form. A target binary code is received. The target binary code is decompiled into a target decompiled code that is in source code form. The target binary code is detected to have a weakness responsive to the second generative AI model identifying the weakness in the target decompiled code.

In another embodiment, a computer system comprises at least one processor and a memory, the memory of the computer system storing instructions that when executed by the at least one processor of the computer system cause the computer system to: receive vulnerable code snippets, each of the vulnerable code snippets being in source code form and having one or more weaknesses; complete, using a first generative AI model, the vulnerable code snippets into corresponding compilable codes that are in source code form; compile the compilable codes into corresponding binary codes; decompile the binary codes into corresponding decompiled codes that are in source code form; train a second generative AI model, using the decompiled codes as training data, to identify weaknesses in target decompiled codes that are in source code form; receive a target binary code; decompile the target binary code into a target decompiled code that is in source code form; and detect that the target binary code has a weakness responsive to the second generative AI model identifying the weakness in the target decompiled code.

In yet another embodiment, a method of training a first generative AI model to detect weaknesses in decompiled codes includes receiving vulnerable code snippets that are in source code form. For each vulnerable code snippet: the vulnerable code snippet is completed into a compilable code that is in source code form using a second generative AI model, the compilable code is compiled into a binary code, the binary code is decompiled into a decompiled code that is in source code form, and the first generative AI model is trained using the decompiled code.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
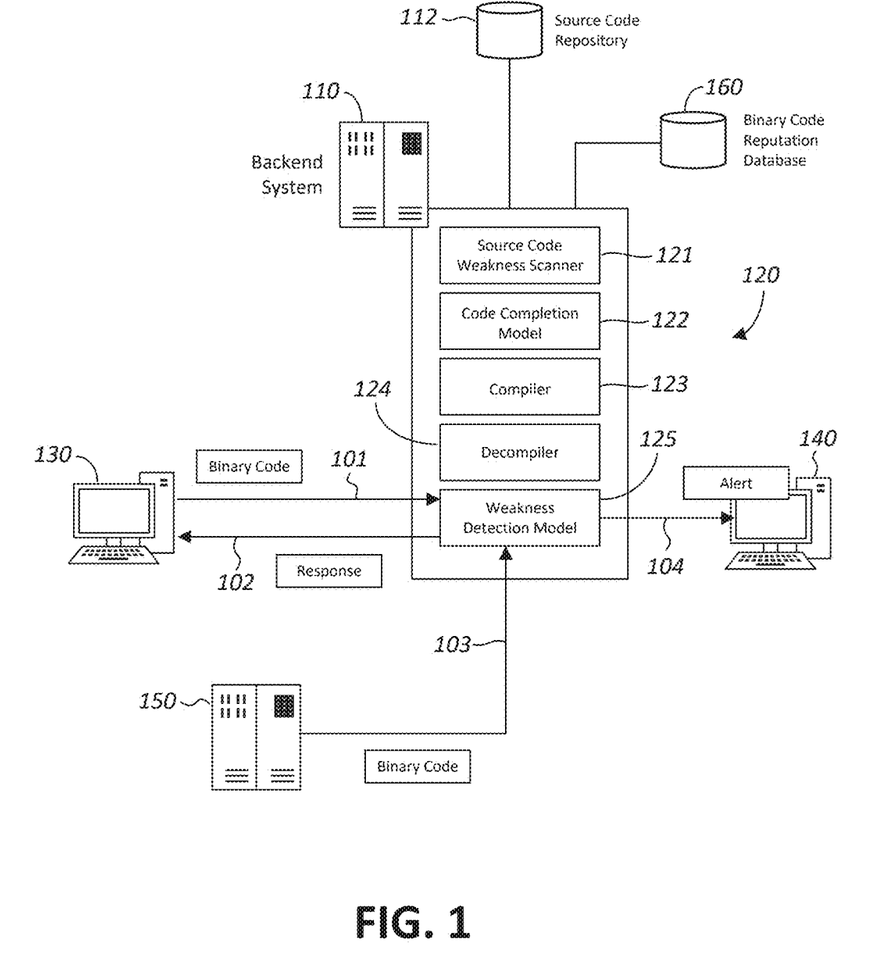
FIG. 1 shows a block diagram of a backend system, in accordance with an embodiment of the present invention.

FIG. 1 shows a block diagram of a backend system 110, in accordance with an embodiment of the present invention. The backend system 110 may be implemented on a cloud computing platform (e.g., Amazon Web Services (AWS)™ platform), dedicated server system, distributed computer system, or other computer system. In the example of FIG. 1, the backend system 110 hosts weakness detection modules 120 for detecting weaknesses in binary codes. The weakness detection modules 120 are implemented as program code and comprise a source code weakness scanner 121, a code completion model 122, one or more compilers 123, one or more decompilers 124, and a weakness detection model 125. The backend system 110 may comprise at least one processor and a memory, with the memory storing instructions of the weakness detection modules 120 that when executed by the at least one processor cause the backend system 110 to operate as described herein.

A source code repository 112 may comprise cloud storage, local storage, network attached storage, or other storage device accessible to the backend system 110. In the example of FIG. 1, the source code repository 112 stores vulnerable (i.e., has one or more weaknesses) source codes. A vulnerable source code may be a complete source code or a code snippet, with a code snippet being a source code of a function (referred to as function code) or a portion of a complete source code. Weaknesses in vulnerable source codes may be identified by way of the Common Vulnerabilities and Exposures (CVE) list. For example, entries in the CVE list may be used to locate files containing vulnerable source codes, which may be tagged with corresponding weakness labels by mapping a CVE entry to a corresponding CWE entry. Weaknesses in vulnerable source codes may also be identified by using the source code weakness scanner 121. More particularly, vulnerable source codes in the source code repository 112 may be scanned by the source code weaknesses scanner 121 to identify code portions and function codes that have corresponding CWE entries. The source code weakness scanner 121 may be a conventional CWE source code scanner or a suitable conventional source code scanning tool.

The code completion model 122 may comprise a generative artificial intelligence (AI) model, which in one embodiment is a Large Language Model (LLM). The code completion model 122 is trained to complete an input code snippet into a compilable code, i.e., source code that can be successfully compiled by a compiler 123 into an executable binary code. Error information from the compilation process may be used as a feedback to fine-tune the code completion model 122.

Compilable code generated by the code completion model 122 is compiled by a compiler 123 to generate a corresponding executable binary code. The compilable code may be compiled for different computer architectures (e.g., Aarch64, x86/64, RTOS, QNS) using a corresponding compiler 123. This allows multiple binary codes to be generated from the same compilable code. A binary code may then be decompiled by a decompiler 124 (e.g., Ghidra reverse engineering tool) back to a source code, which is referred to herein as decompiled code. Decompiled codes may be used as training data to train the weakness detection model 125.

The weakness detection model 125 may comprise a generative AI model, which in one embodiment is an LLM. The weakness detection model 125 is trained to identify weaknesses in decompiled codes. During detection phase, the weakness detection model 125 may be used in conjunction with the decompiler 124 to detect weaknesses in target (i.e., being evaluated) binary codes.

For example, target binary code from a computer system 130 may be sent to the backend system 110 over a computer network (see arrow 101), which may include the public Internet. In the backend system 110, the target binary code may be decompiled by the decompiler 124 to a target decompiled code. The target decompiled code is input to a weakness detection model 125, which outputs a response that identifies, if present, one or more weaknesses in the target decompiled code. The target binary code is detected to have a weakness if the weakness detection model 125 identifies the weakness in the target decompiled code. Otherwise, if the weakness detection model 125 does not identify a weakness in the target decompiled code, the target binary code is deemed to be normal, i.e., without an identifiable weakness. The response from the weakness detection model 125 may be sent to the computer system 130 (see arrow 102).

As another example, one or more target binary codes may be sent from a computer system 150 to the backend system 110 over the computer network (see arrow 103). In the backend system 110, the target binary codes may be decompiled by the decompiler 124 into corresponding target decompiled codes, which are input to the weakness detection model 125. For each target decompiled code, the weakness detection model 125 outputs a response that identifies one or more weaknesses that may be present in the target decompiled code. The responses from the weakness detection model 125 and identifiers (e.g., hash) of corresponding target binary codes may be stored in a binary code reputation database 160. The binary code reputation database 160 may be stored in cloud storage, local storage, network attached storage, or other storage device accessible to the backend system 110. The backend system 110 or other computer system may consult the binary code reputation database 160 to determine whether a target binary code has a weakness.

A response from the weakness detection model 125 may also be sent to a computer system 140 as an alert (see arrow 104). For example, the alert may be a message that is displayed on a display screen of the computer system 140 to alert developers, Information Technology (IT) personnel, Security Operations Center (SOC) personnel, cybersecurity researchers/experts, or other personnel responsible for or interested in detecting weaknesses in binary codes. As another example, the alert may be a signal that is sent to alert a cybersecurity module running on the computer system 140.

Figure 2:
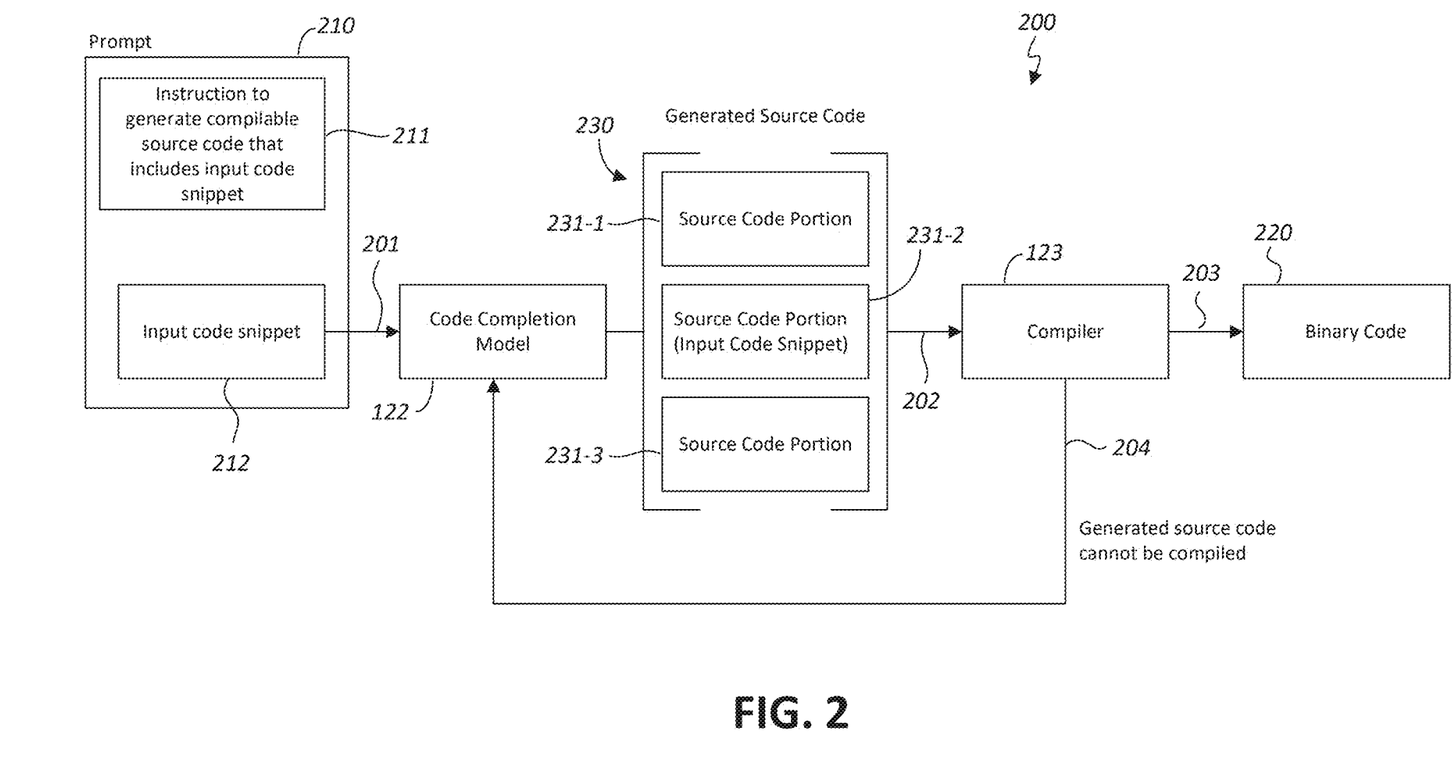
FIG. 2 shows a flow diagram of a method of completing a code snippet into compilable code, in accordance with an embodiment of the present invention.

FIG. 2 shows a flow diagram of a method 200 of completing a code snippet into compilable code, in accordance with an embodiment of the present invention. In the example of FIG. 2, the code completion model 122 is provided a prompt 210 comprising an instruction 211 and an input code snippet 212 (see arrow 201). The instruction 211 indicates the task given to the code completion model 122, which in the example of FIG. 2 is to complete the input code snippet 212 by generating a compilable code that includes the input code snippet 212. For example, the instruction 211 may be as shown in Table 1 below.

TABLE 1

You are a C/C++ language expert, skilled in rewriting the provided code snippets into compilable code.
Please follow the instructions below to complete the code completion task:
1. There should be a call to the example code snippet.
2. Please imagine what content the corresponding struct data structure should have.
. . .
N. The code you provide should be concise, efficient, and maintain its (code snippet) original meaning.
Take a deep breath, I'll give you the code snippet later.

For the example instruction of Table 1, the input code snippet may be as shown in Table 2 below.

TABLE 2

```
f_getcmdwintype(typval_T *argvars UNUSED, typval_T *rettv)
{
    rettv->v_type = VAR_STRING;
    rettv->vval.v_string = NULL;
#ifdef FEAT_CMDWIN
    rettv->vval.v_string = alloc(2);
    if(rettv->vval.v_string != NULL)
    {
        rettv->vval.v_string[0] = cmdwin_type;
        rettv->vval.v_string[1] = NULL;
    }
#endif
}
```

The input code snippet of Table 2 is a function code that describes a CWE entry having the identifier CWE-78, which is described as "Improper Neutralization of Special Elements used in an OS Command ('OS Command Injection')". The prompt 210 containing the instruction 211 as in Table 1 and the input code snippet 212 as in Table 2 prompt the code completion model 122 to generate a compilable code that includes the function code of CWE-78.

In the example of FIG. 2, in response to the prompt 210, the code completion model 122 outputs a generated source code 230. It is to be noted that generative AIs, LLMs in particular, are well-suited to code completion tasks given the textual, human-readable nature of source codes. However, the generated source code 230 may or may not be compilable depending on how well the code completion model 122 has been trained at this point.

The generated source code 230 is a potentially compilable code that includes source code portions 231-1, 231-2, 231-3, etc. The source code portion 231-2 includes the input code snippet 212, whereas the source code portions 231-1 and 231-3 have been added by the code completion model 122. Continuing the example of Table 1 and Table 2, the source code portion 231-1 may be as shown in Table 3, the source code portion 231-2 may be as shown in Table 2, and the source code portion 231-3 may be as shown in Table 4.

TABLE 3

```
#include<stdlib.h>
#define UNUSED_attribute__((unused))
#define VAR_STRING 1
#define NUL '\\0'
#ifdef FEAT_CMDWIN
    extern char cmdwin_type;
#endif
typedef struct {
    int v_type;
    union {
        char *v_string;
    }
    vval;
}
typval_T;
void *alloc(size_t size) {
    return malloc(size);
}
```

Note that in the following Table 4, the source code portion makes a call to the input code snippet ("f_getcmdwintype") of Table 2 as per the instruction of Table 1.

TABLE 4

```
int main( ) {
    typval_T rettv;
#ifdef FEAT_CMDWIN
    cmdwin_type = 'N';
#endif
    f_getcmdwintype(NULL, &rettv);
    return 0;
}
```

The generated source code 230 is then compiled by the compiler 123 (see arrow 202). When the generated source code 230 cannot be compiled, the corresponding error information from the compiler 123 is fed back to the code completion model 122 (see arrow 204) to allow the code completion model 122 to learn from the error and adjust the subsequent generated source code 230. This feedback process may be iterated until the code completion model 122 is able to generate a source code that can be successfully compiled by the compiler 123 into a binary code 220 that is executable (see arrow 203). The method 200 may be repeated for different input code snippets 212 to obtain a plurality of binary codes 220. Furthermore, the same generated source code 230 for an input code snippet 212 may be compiled several times using different compilers 123 for different computer architectures, so that a plurality of binary codes 220 is generated. The plurality of binary codes 220 is decompiled by the decompiler 124 to generate corresponding decompiled codes, which are used to train the weakness detection model 125.

Unlike typical code generation processes, the use of generative AI in the method 200 aims to preserve the writing style of an input code snippet, with minimal amount of code added to complete the input code snippet into source code that can be compiled and executed. By retaining the intention of the input code snippets, the resulting binary codes maintain the control flow of the input code snippets, thereby achieving a higher fidelity of decompiled codes for the weakness detection model 125 to learn from.

It is to be noted that native generative AI models of some AI platforms (e.g., LLaMA2 model of Meta Platforms, Inc.) require ample and high-quality training data to learn specific professional fields, which is often challenging to obtain in the field of binary code weakness detection. Advantageously, the use of generative AI in the method 200 allows augmentation of an input code snippet based on its context, enabling the input code snippet to be compiled for different computer architectures and thereby generating sufficient binary codes for subsequent training of the weakness detection model 125.

Figure 3:
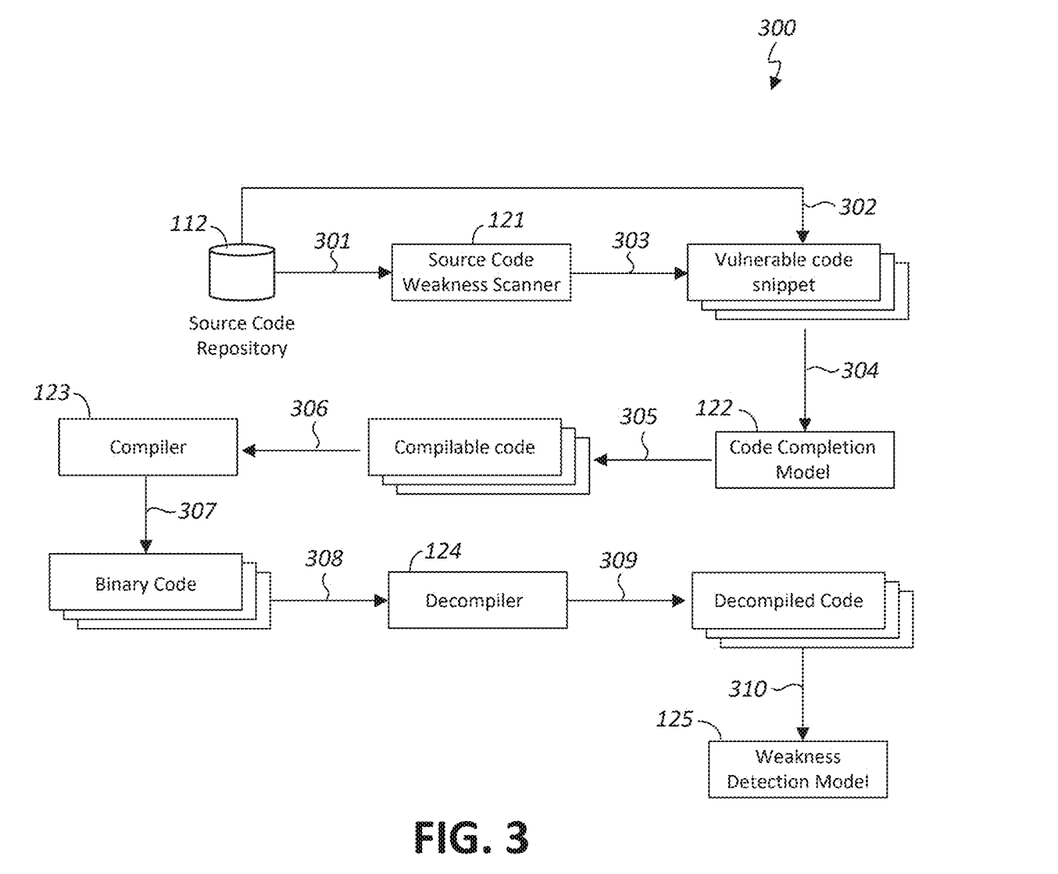
FIG. 3 shows a flow diagram of a method of training a weakness detection model to identify weaknesses in decompiled codes, in accordance with an embodiment of the present invention.

FIG. 3 shows a flow diagram of a method 300 of training the weakness detection model 125 to identify weaknesses in decompiled codes, in accordance with an embodiment of the present invention. In the example of FIG. 3, vulnerable source codes from the source code repository 112 are scanned by the source code weakness scanner 121 (see arrow 301) to identify and extract vulnerable code snippets (see arrow 303), i.e., code snippets with one or more weaknesses. Known vulnerable code snippets, such as function codes with corresponding CWE entries, may also be received from the source code repository 112 (see arrow 302). The vulnerable code snippets are input to the code completion model 122 for completion (see arrow 304). The code completion model 122 completes the vulnerable code snippets into compilable source codes (see arrow 305). One or more compilers 123 receive (see arrow 306) and compile the compilable source codes into corresponding binary codes that are executable (see arrow 307). The decompiler 124 receives the binary codes (see arrow 308) and decompiles the binary codes into corresponding decompiled codes (see arrow 309). The weakness detection model 125 is trained to identify one or more weaknesses that may be present in a target decompiled code using the decompiled codes from the decompiler 124 as training data (see arrow 310).

It is to be noted that decompiled codes may not be identical to their corresponding compilable codes. A decompiled code can have significantly more or less content than its corresponding compilable code and, depending on whether the symbol table is preserved, operators, reserved words, and variable names in the decompiled code can also vary. The weakness detection model 125, being a generative AI with contextual understanding capabilities, can overlook these textual differences and identify the presence of specific weaknesses based on the relative positions and sequences of the text. This is further illustrated with reference to Table 5, which shows a decompiled version of the input code snippet of Table 2.

TABLE 5

```
void f_getcmdwintype(undefined8 param_1, undefined4 *param_2)
{
    *param_2 = 1;
    *(undefined8 *)(param_2 + 2) = 0;
    return;
}
```

As previously explained, the input code snippet of Table 2 is a function code having a weakness identified as CWE-78. Comparing Table 2 to Table 5, variable names are lost during the code completion, compilation, and decompilation processes. However, the decompiled code retains the logic of the function code, and may also retain the name of the function code (i.e., "f_getcmdwintype") depending on whether the decompiler includes the symbol table.

Figure 4:
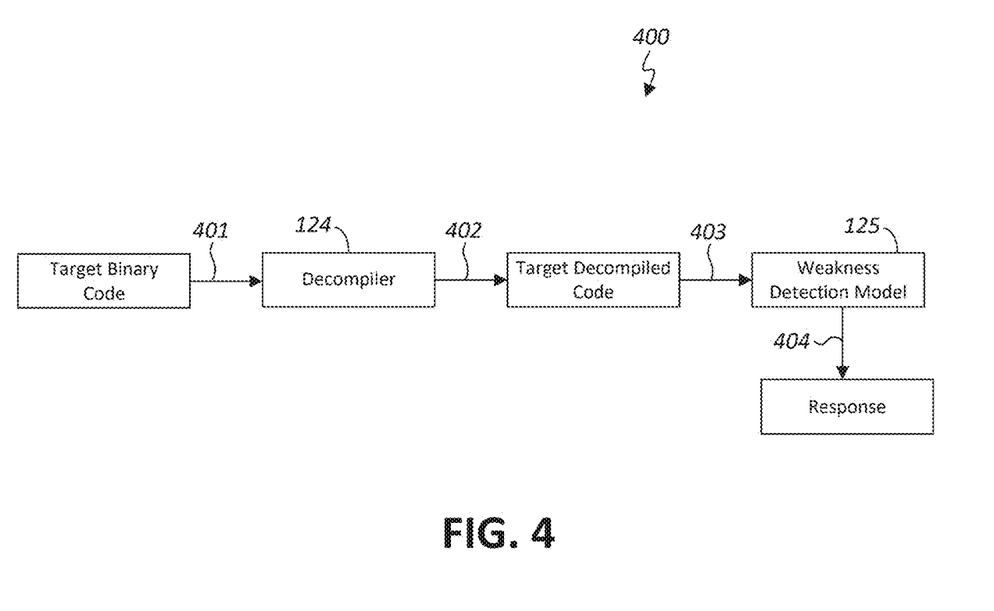
FIG. 4 shows a flow diagram of a method of detecting weaknesses in binary codes, in accordance with an embodiment of the present invention.

FIG. 4 shows a flow diagram of a method 400 of detecting weaknesses in binary codes, in accordance with an embodiment of the present invention. In the example of FIG. 4, a target binary code is input to a decompiler 124 (see arrow 401). The decompiler 124 decompiles the target binary code into a target decompiled code (see arrow 402), which is in source code form. The target decompiled code is input to the weakness detection model 125 (see arrow 403), which outputs a response (see arrow 404). The response from the weakness detection model 125 identifies one or more weaknesses that may be present in the target decompiled code. As can be appreciated, a weakness in the target decompiled code indicates that the corresponding target binary code also has the weakness. The response may also include the portion of the target decompiled code that has been identified as having the weakness. The target binary code is deemed to be normal when the response indicates that no weakness has been identified in the target decompiled code.

Figure 5:
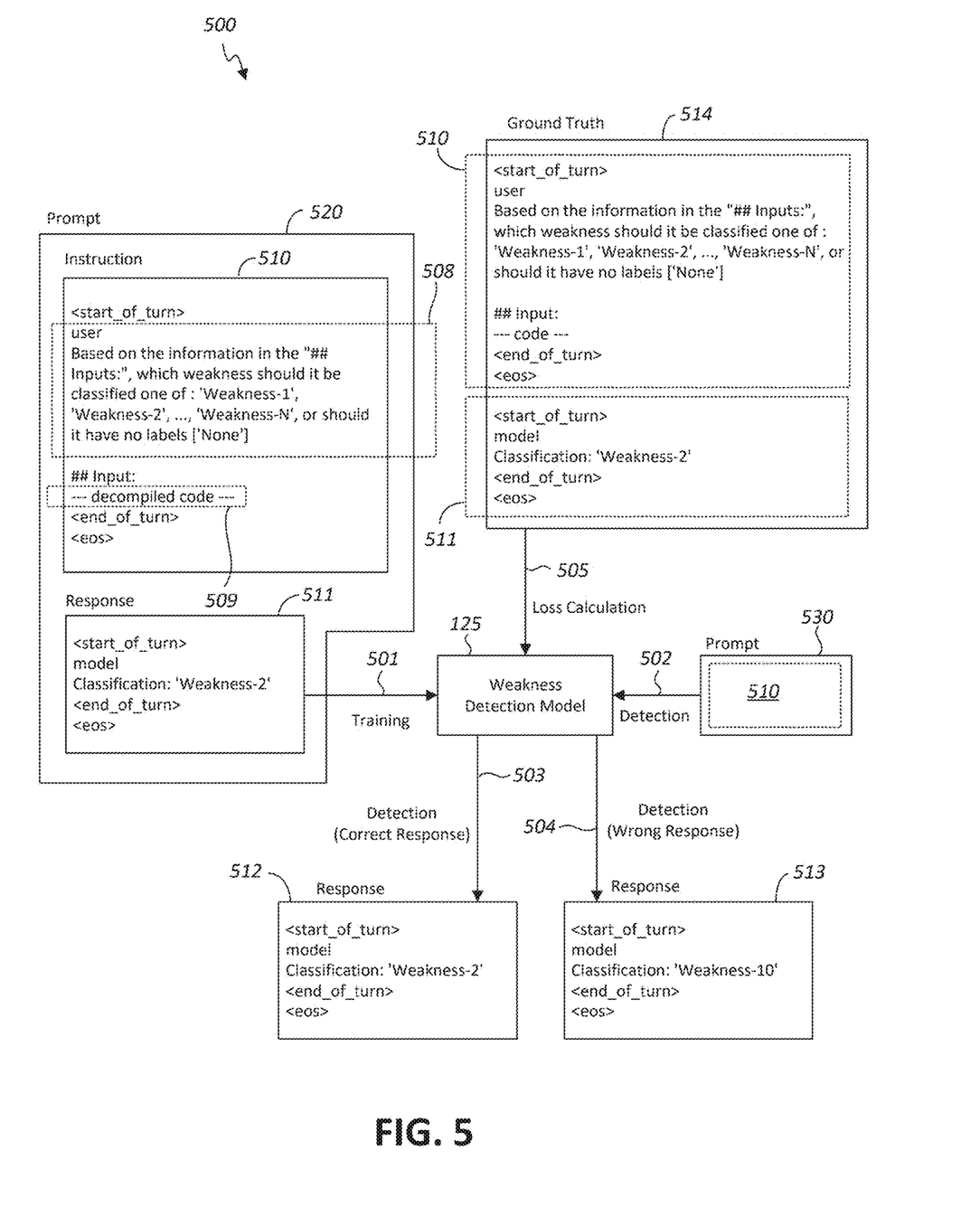
FIG. 5 shows a flow diagram of a method of training a weakness detection model to identify weaknesses in decompiled codes, in accordance with an embodiment of the present invention.

FIG. 5 shows a flow diagram of a method 500 of training the weakness detection model 125 to identify weaknesses in decompiled codes, in accordance with an embodiment of the present invention. In the example of FIG. 5, a prompt 520 is input to the weakness detection model 125 during the training phase of the weakness detection model 125 (see arrow 501). The prompt 520 includes an instruction 510 and an expected response 511. In the example of FIG. 5, the instruction 510 includes an instruction part 508 that instructs the weakness detection model 125 to classify a decompiled code 509.

During the detection phase, a prompt 530 containing the instruction 510 is input to the weakness detection model 125 (see arrow 502). Depending on the sufficiency of its training at that point, the weakness detection model 125 may output a correct response 512 (see arrow 503) or a wrong response 513 (see arrow 504) responsive to the instruction 510 of the prompt 530. During fine-tuning of the weakness detection model 125, loss calculation is performed by providing a ground truth 514 to the weakness detection model 125 (see arrow 505).

Loss calculation is well-known in the field of machine learning, which includes generative AI. Briefly, loss calculation measures the difference between the generated response and the expected response. Ground truth data act as a benchmark or reference against which the generated response is compared for loss calculation. Once the loss is calculated, the gradients of the loss function are computed with respect to each model parameter through backpropagation. These gradients are then used to update the model parameters in an attempt to minimize the loss. The loss calculation process is repeated, with the model parameters being continuously refined to minimize the loss, thereby improving the model's ability to output realistic responses.

In the example of FIG. 5, the ground truth 514 includes the instruction 510 and the expected response 511. Although the method 500 may be workable in certain cases, the method 500 may result in model hallucination because the ground truth 514 includes the instruction 510 for loss calculation. The inventor believes that doing so can cause the weakness detection model 125 to incorporate the instruction 510 in its response. The method 600 of FIG. 6 addresses this concern.

Figure 6:
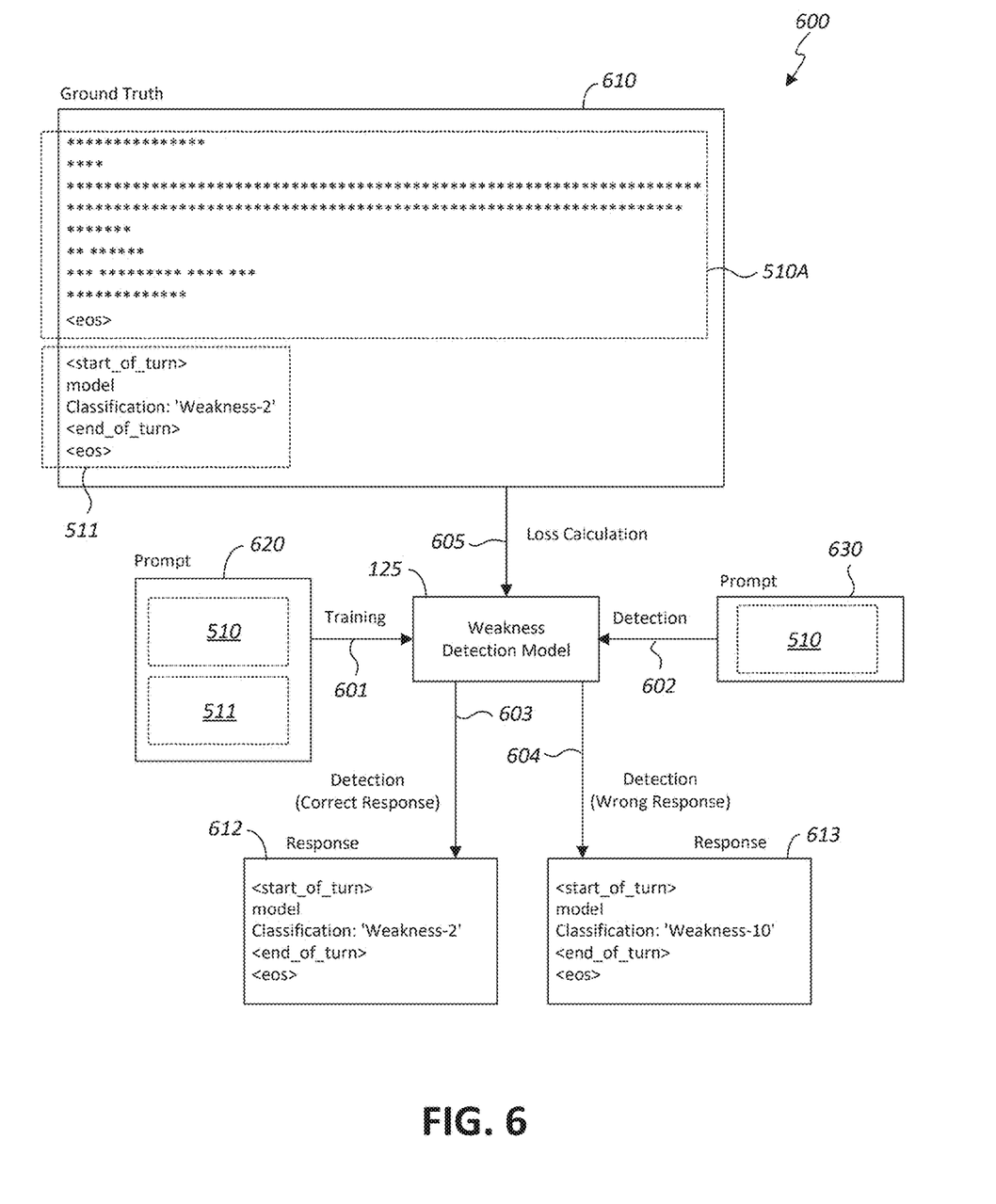
FIG. 6 shows a flow diagram of a method of training a weakness detection model to identify weaknesses in decompiled codes, in accordance with an embodiment of the present invention.

FIG. 6 shows a flow diagram of a method 600 of training the weakness detection model 125 to identify weaknesses in decompiled codes, in accordance with an embodiment of the present invention. In the example of FIG. 6, a prompt 620 is input to the weakness detection model 125 during the training phase of the weakness detection model 125 (see arrow 601). The prompt 620 includes the instruction 510 and the expected response 511 as in the prompt 520 of FIG. 5. As previously noted with reference to FIG. 5, the instruction 510 instructs the weakness detection model 125 to classify a decompiled code.

During the detection phase, a prompt 630 containing the instruction 510 is input to the weakness detection model 125

(see arrow 602). Depending on the sufficiency of its training at that point, the weakness detection model 125 may output a correct response 612 (see arrow 603) or a wrong response 613 (see arrow 604) responsive to the instruction 510 of the prompt 630. During fine-tuning, loss calculation is performed by providing a ground truth 610 to the weakness detection model 125 (see arrow 605). In contrast to the ground truth 514 of FIG. 5, the instruction 510 is masked in the ground truth 610. The instruction 510 is relabeled as 510A in the ground truth 610 to indicate that the instruction 510 has been masked. The expected response 511 in the ground truth 610 is not masked.

Masking may be performed by replacing the characters of the instruction with pre-defined characters (e.g., pound signs), removing the instruction from the ground truth, or some other way that prevents the weakness detection model 125 from considering the instruction for loss calculation. Masking the instruction for loss calculation forces the weakness detection model 125 to calculate the difference between its response and the expected response. This advantageously allows both the correct response and the wrong response to be amplified for loss calculation, thereby preventing model hallucination.

Figure 7:
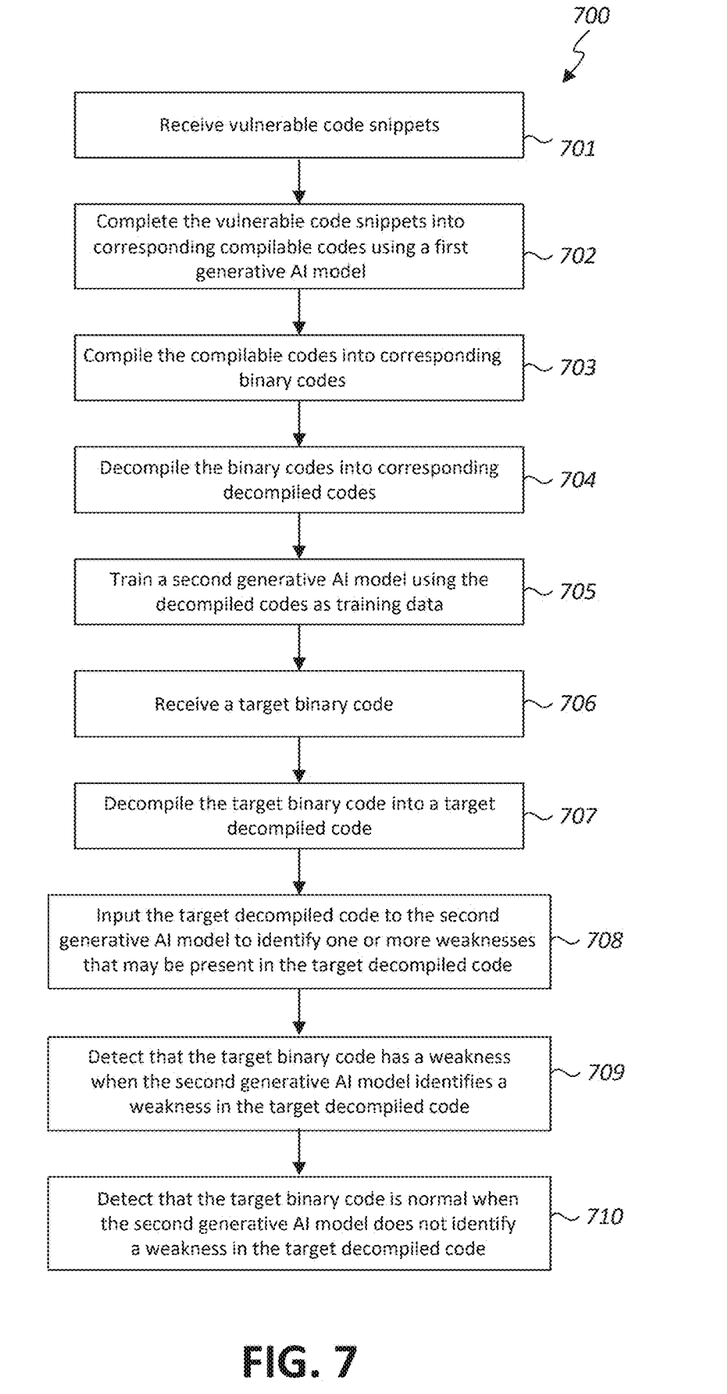
FIG. 7 shows a flow diagram of a method of detecting weaknesses in binary codes, in accordance with an embodiment of the present invention.

FIG. 7 shows a flow diagram of a method 700 of detecting weaknesses in binary codes, in accordance with an embodiment of the present invention.

In step 701, vulnerable code snippets are received. Each of the vulnerable code snippets is in source code form and has one or more weaknesses.

In step 702, the vulnerable code snippets are completed into corresponding compilable codes that are in source code form using a first generative AI model.

In step 703, the compilable codes are compiled into corresponding executable binary codes.

In step 704, the binary codes are decompiled into corresponding decompiled codes that are in source code form.

In step 705, a second generative AI model is trained using the decompiled codes as training data.

In step 706, a target binary code is received.

In step 707, the target binary code is decompiled into a target decompiled code that is in source code form.

In step 708, the target decompiled code is input to the second generative AI model to identify one or more weaknesses that may be present in the target decompiled code.

In step 709, the target binary code is detected to have a weakness when the second generative AI model identifies a weakness in the target decompiled code.

In step 710, the target binary code is detected to be normal when the second generative AI model does not identify a weakness in the target decompiled code.

Figure 8:
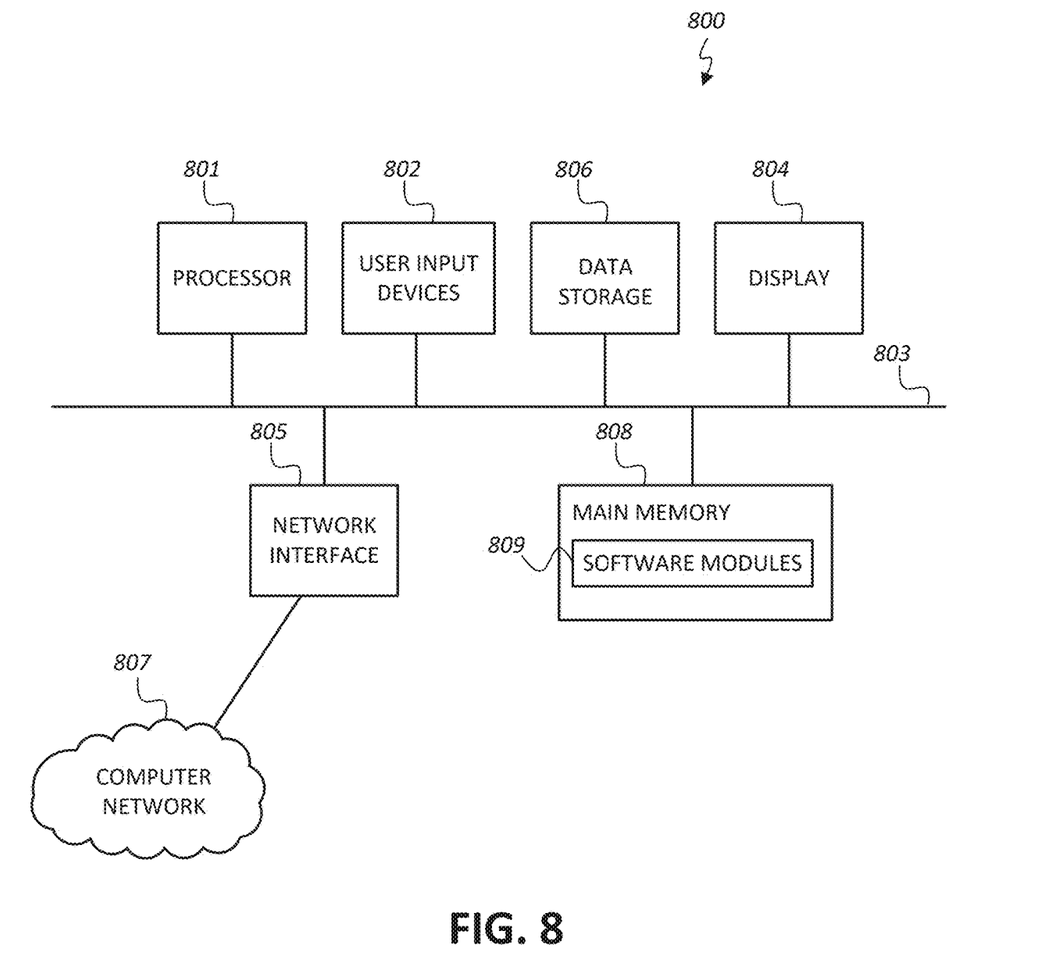
FIG. 8 shows a block diagram of a computer system that may be employed with embodiments of the present invention.

FIG. 8 shows a block diagram of a computer system 800 that may be employed with embodiments of the present invention. The computer system 800 may be employed as a backend system or other computer described herein. The computer system 800 may have fewer or more components to meet the needs of a particular cybersecurity application. The computer system 800 may include one or more processors 801. The computer system 800 may have one or more buses 803 coupling its various components. The computer system 800 may include one or more user input devices 802 (e.g., keyboard, mouse), one or more data storage devices 806 (e.g., hard drive, optical disk, solid state drive), a display screen 804 (e.g., liquid crystal display, flat panel monitor), a computer network interface 805 (e.g., network adapter, modem), and a main memory 808 (e.g., random access memory). The computer network interface 805 may be coupled to a computer network 807, which in this example includes the public Internet.

The computer system 800 is a particular machine as programmed with one or more software modules 809, comprising instructions stored non-transitory in the main memory 808 for execution by at least one processor 801 to cause the computer system 800 to perform corresponding programmed steps. An article of manufacture may be embodied as computer-readable storage medium including instructions that when executed by at least one processor 801 cause the computer system 800 to be operable to perform the functions of the one or more software modules 809.

In one embodiment where the computer system 800 is configured as a backend system, the software modules 809 comprise weakness detection modules.

While specific embodiments of the present invention have been provided, it is to be understood that these embodiments are for illustration purposes and not limiting. Many additional embodiments will be apparent to persons of ordinary skill in the art reading this disclosure

What is claimed is:

1. A method of detecting weaknesses in binary codes, the method comprising:
   receiving vulnerable code snippets, each of the vulnerable code snippets being in source code form and having one or more weaknesses;
   completing, using a first generative artificial intelligence (AI) model, the vulnerable code snippets into corresponding compilable codes that are in source code form;
   compiling the compilable codes into corresponding binary codes;
   decompiling the binary codes into corresponding decompiled codes that are in source code form;
   training a second generative AI model, using the decompiled codes as training data, to identify weaknesses in target decompiled codes that are in source code form;
   receiving a target binary code;
   decompiling the target binary code into a target decompiled code that is in source code form;
   detecting that the target binary code has a weakness responsive to the second generative AI model identifying the weakness in the target decompiled code.

2. The method of claim 1, wherein detecting that the target binary code has the weakness responsive to the second generative AI model detecting the weakness in the target decompiled code comprises:
   providing a first prompt to the second generative AI model, the first prompt including a first instruction to the second generative AI model to identify a weakness in the target decompiled code.

3. The method of claim 1, further comprising:
   providing a second prompt to the second generative AI model during a training phase of the second generative AI model, the second prompt including a second instruction to the second generative AI model to identify a weakness in a particular decompiled code and an expected response to the second instruction;
   providing a third prompt to the second generative AI model during a detection phase of the second generative AI model, the third prompt including the second instruction;
   the second generative model AI outputting a response that is responsive to the third prompt during the detection phase; and fine-tuning the second generative AI model by providing ground truth data to the second generative AI model for loss calculation,
wherein the ground truth data include the expected response to the second instruction, and the second instruction is masked in the ground truth data.

4. The method of claim 3, wherein the second instruction is masked in the ground truth by replacing characters of the second instruction with predetermined characters.

5. The method of claim 1, wherein each of the compilable codes comprises a corresponding input code snippet and one or more code portions that have been added by the first generative AI model.

6. The method of claim 1, wherein completing, using the first generative AI model, the vulnerable code snippets into corresponding compilable codes that are in source code form comprises:
for each vulnerable code snippet, using the first generative AI model to generate a generated source code that includes the vulnerable code snippet;
compiling the generated source code;
when the generated source code fails compilation, feeding back error information from the compilation to the first generative AI model to adjust the generative AI model; and
when the generated source code successfully compiles into a binary code, decompiling the binary code into a decompiled code, and using the decompiled code to train the second generative AI model.

7. A computer system comprising at least one processor and a memory, the memory of the computer system storing instructions that when executed by the at least one processor of the computer system cause the computer system to:
receive vulnerable code snippets, each of the vulnerable code snippets being in source code form and having one or more weaknesses;
complete, using a first generative artificial intelligence (AI) model, the vulnerable code snippets into corresponding compilable codes that are in source code form;
compile the compilable codes into corresponding binary codes;
decompile the binary codes into corresponding decompiled codes that are in source code form;
train a second generative AI model, using the decompiled codes as training data, to identify weaknesses in target decompiled codes;
receive a target binary code;
decompile the target binary code into a target decompiled code that is in source code form; and
detect that the target binary code has a weakness responsive to the second generative AI model identifying the weakness in the target decompiled code.

8. The computer system of claim 6, further comprising:
a source code repository that stores a plurality of vulnerable source codes.

9. The computer system of claim 7, wherein the instructions stored in the memory of the computer system, when executed by the at least one processor of the computer system, cause the computer system to:
extract the vulnerable code snippets from the plurality of vulnerable source codes.

10. The computer system of claim 7, wherein the instructions stored in the memory of the computer system, when executed by the at least one processor of the computer system, cause the computer system to:
receive the target binary code from another computer system; and
provide a response to the other computer system, the response indicating that the target binary code is detected to have a weakness.

11. A method of training a first generative artificial intelligence (AI) model to identify weaknesses in target decompiled codes, the method comprising:
receiving vulnerable code snippets that are in source code form; and
for each vulnerable code snippet: completing the vulnerable code snippet into a compilable code that is in source code form using a second generative AI model, compiling the compilable code into a binary code, decompiling the binary code into a decompiled code that is in source code form, and training the first generative AI model using the decompiled code.

12. The method of claim 11, wherein completing the vulnerable code snippet into the compilable code comprises:
completing the vulnerable code snippet into a generated source code using the second generative AI model;
compiling the generated source code; and
feeding back error information to the second generative AI model when the generated source code does not successfully compile,
wherein the generated source code is the compilable code when the generated source code successfully compiles.

13. The method of claim 11, further comprising:
providing a prompt to the first generative AI model during a training phase of the first generative AI model, the prompt including an instruction to the first generative AI model to identify a weakness in a particular decompiled code and an expected response to the instruction;
the first generative model AI outputting a response that is responsive to the prompt during a detection phase of the first generative AI model; and
fine-tuning the first generative AI model by providing the first generative AI model ground truth data for loss calculation, the ground truth data including the expected response to the instruction,
wherein the instruction is masked in the ground truth data.

14. The method of claim 13, wherein characters of the instruction are replaced with predetermined characters in the ground truth data.

15. The method of claim 11, wherein receiving the vulnerable code snippets that are in source code form comprises:
receiving a plurality of vulnerable source codes; and
extracting the vulnerable code snippets from the vulnerable source codes.

16. The method of claim 11, wherein the vulnerable code snippets include function codes that are in a Common Weaknesses Enumeration (CWE) list.

* * * * *